United States Patent [19]

Kruse

[11] Patent Number: 4,513,980
[45] Date of Patent: Apr. 30, 1985

[54] CHUCK COLLET

[76] Inventor: William C. Kruse, 1925 Vinsetta Blvd., Royal Oak, Mich. 48073

[21] Appl. No.: 226,490

[22] Filed: Jan. 19, 1981

[51] Int. Cl.³ ............................................. B23B 31/12
[52] U.S. Cl. ........................................ 279/51; 279/16; 279/46 R; 279/121; 279/123
[58] Field of Search ............... 279/1 ME, 1 N, 1 SG, 279/1 T, 7, 17, 34, 39, 46, 46 A, 47, 48, 49, 50, 51, 52, 53, 108, 110, 113, 16, 121, 123, 107

[56] References Cited

U.S. PATENT DOCUMENTS

| | | |
|---|---|---|
| 1,060,845 | 5/1913 | Johnson . |
| 2,147,885 | 2/1939 | Dean ....................... 279/50 |
| 2,935,329 | 5/1959 | Hessler . |
| 3,361,433 | 1/1968 | Holdridge ............... 279/51 |
| 3,385,607 | 5/1968 | Hughes ................... 279/51 |
| 3,746,353 | 7/1973 | Allen . |
| 3,841,645 | 10/1974 | Parsons ................... 279/50 |
| 3,863,940 | 2/1975 | Cummings ............... 279/50 |
| 3,918,727 | 11/1975 | Forsythe ................. 279/50 |
| 4,215,871 | 8/1980 | Hirsch et al. ........... 279/46 |

FOREIGN PATENT DOCUMENTS

| | | | |
|---|---|---|---|
| 109422 | 12/1967 | Denmark ............... | 279/48 |
| 664387 | 4/1937 | Fed. Rep. of Germany ........ | 279/48 |
| 2447004 | 4/1976 | Fed. Rep. of Germany ........ | 279/23 |
| 179166 | 11/1966 | U.S.S.R. ............... | 279/110 |

Primary Examiner—William R. Briggs
Assistant Examiner—Thomas Kline
Attorney, Agent, or Firm—Harness, Dickey & Pierce

[57] ABSTRACT

An improved chuck collet in which the elements of the collet, namely the jaw segments, the mounting base, and the interconnecting flexible members, are separate elements thus permitting a selection of materials for the elements to give optimum operating characteristics to the assembly at economical costs.

1 Claim, 7 Drawing Figures

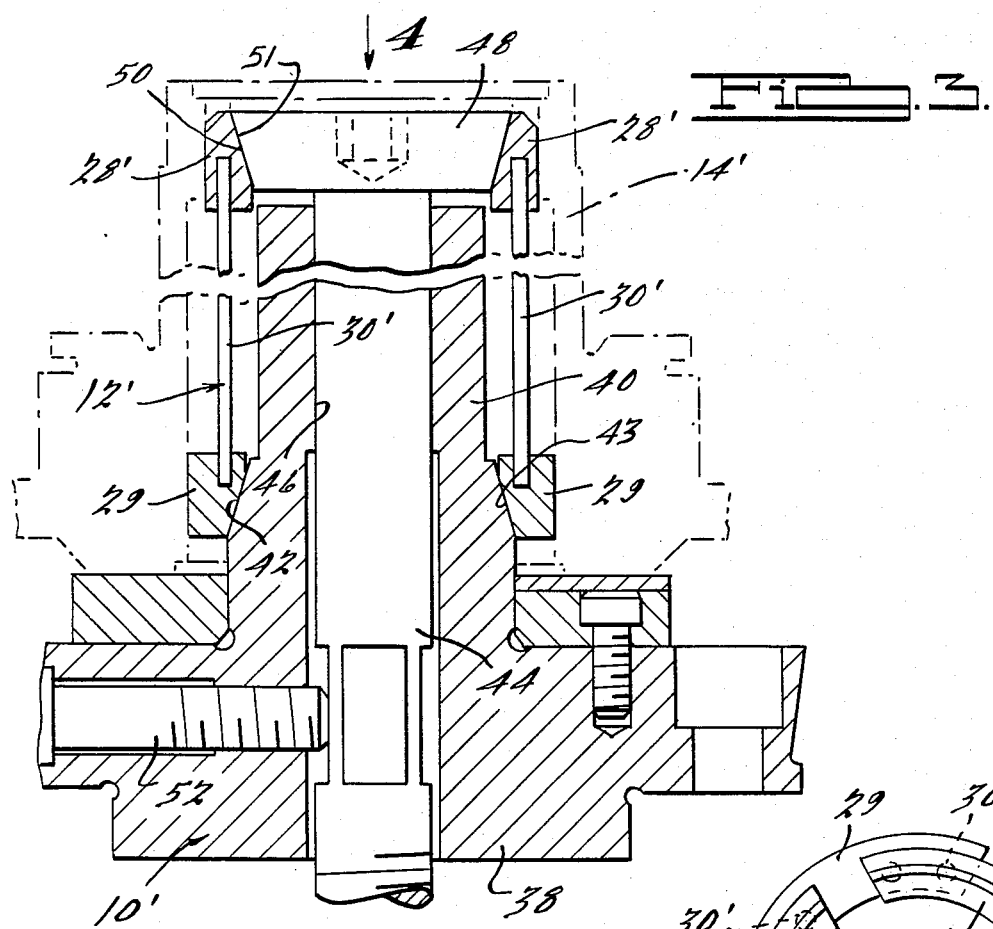
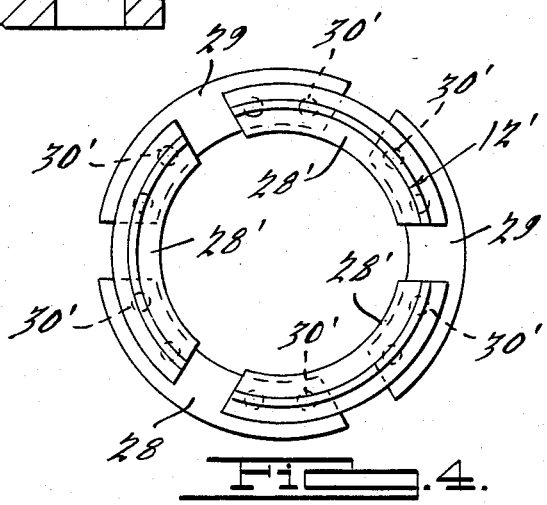
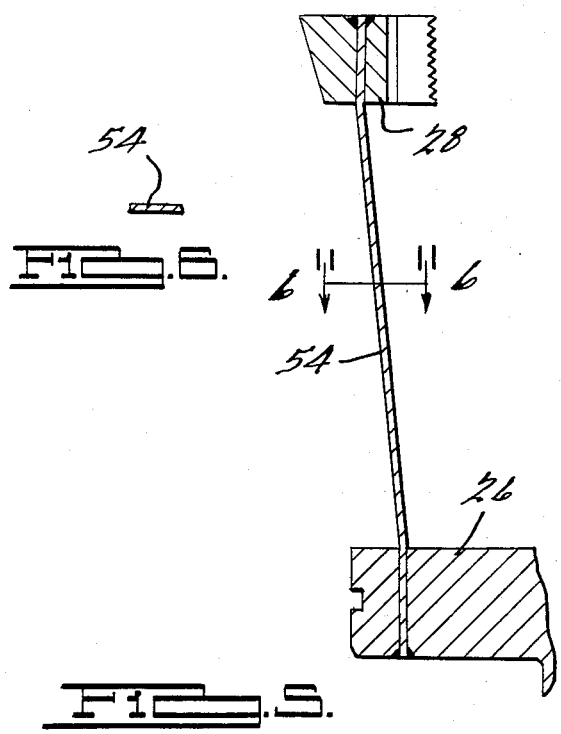

CHUCK COLLET

BACKGROUND OF THE INVENTION

The present invention relates to chucks and particularly to improvements in the collets for use with such chucks. Such improved chuck collets are particularly useful with rough workpieces for roughing operations, although also useful for finishing operations.

Different modifications of the invention are adapted to support workpieces of different contours either externally or internally, i.e. engaging either the O.D. or I.D. of the workpieces.

In general, the chuck collet comprises a pair of axially spaced first and second surfaces adapted to engage corresponding spaced surfaces on the clutch body and have engaging cam surfaces to effect radial movement of the workpiece. In particular, according to the present invention, the grip engaging portions of the collet are in the form of a plurality of separate, annular jaw segments. Such jaw segments are connected to the other collet surface, which in the preferred embodiment is an annular base member and in a modification are other jaw segments, by a plurality of elongated spring elements or members. In the preferred embodiment, the connecting members are in the form of spring steel rods and in another modification the connecting members are in the form of flat spring leafs. In another modification, a single flat leaf spring of calculated width for proper flexing is employed to interconnect the jaws with the collet base. The rods have been found to be more advantageous.

The interconnecting members, in all of the three modifications disclosed, are separate elements from the gripping jaws and the collet base support. This has the manufacturing and economical advantages over prior chuck collets of being able to select different materials for these parts and not compromise the functions of the respective parts. For example, the gripping jaws can be made much harder, as separate elements, e.g., up to 50–60 Rock. C, or of solid carbide.

This means that material for the rods or leafs may be selected independently of the jaw material to give the best results and with greater economy. They may be of selected spring steel, having the optimum flexibility over a long range and optimum fatigue life. This accomplishes a greater range in handling rough workpieces as well as a longer flex life. A further advantage is better chip clearance.

DESCRIPTION OF PRIOR ART

In general, the clutch collets of the prior art are formed of a single piece of metal worked or shaped to the desired configurations. A limited prior art patent search was made which revealed the following prior art:

| U.S. Pat. No. | Inventor | Issue Date |
| --- | --- | --- |
| 1,060,845 | J. W. Johnson | May 6, 1913 |
| 2,935,329 | G. Hessler | May 20, 1959 |
| 3,746,353 | Allen | July 17, 1973 |

These patents fail to accomplish the benefits of the present invention as the prior art collets are of unitary structure and do not have the advantages described above in connection with the present invention.

BRIEF SUMMARY OF THE INVENTION

The present invention provides an improved chuck collet in which the collet is formed of separate elements or parts, i.e. the plurality of gripping jaws are separate members which may be formed of a selected material; the collet base is separate and formed of a selected and different material; and the interconnecting elements such as the rods or leafs are separate and formed of a selected, different material.

The result is an improved chuck collet having the optimum properties for accommodating and gripping rough surfaces of workpieces; and having a long flex life at economical costs.

BRIEF DESCRIPTION OF THE DRAWINGS

FIG. 3 is a longitudinal cross-sectional view of a second embodiment of the invention.

FIG. 4 is a partial top plan view of FIG. 3 in the direction of arrow 4.

FIG. 5 is a partial cross-sectional view showing a modified interconnection between the collet jaws and the collet base.

FIG. 6 is a cross-sectional view taken along the line 6—6 of FIG. 5.

FIG. 7 is a partial top plan view of a modified connection between the gripping jaws and the base member of the chuck collet.

DETAILED DESCRIPTION OF PREFERRED EMBODIMENTS

Figure 1:
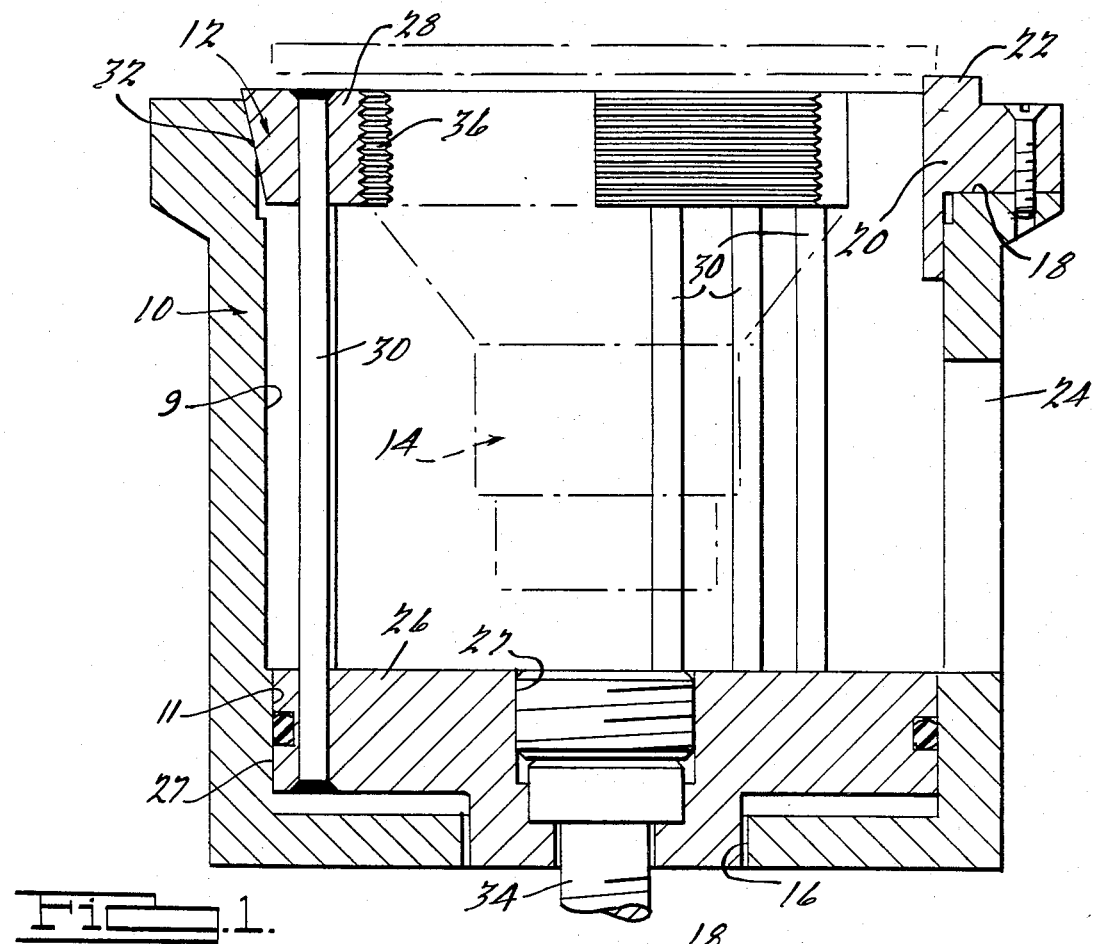
FIG. 1 is a longitudinal cross-sectional view of the chuck and chuck collet of the present invention, particularly for holding a workpiece on the inside of the collet.
Figure 2:
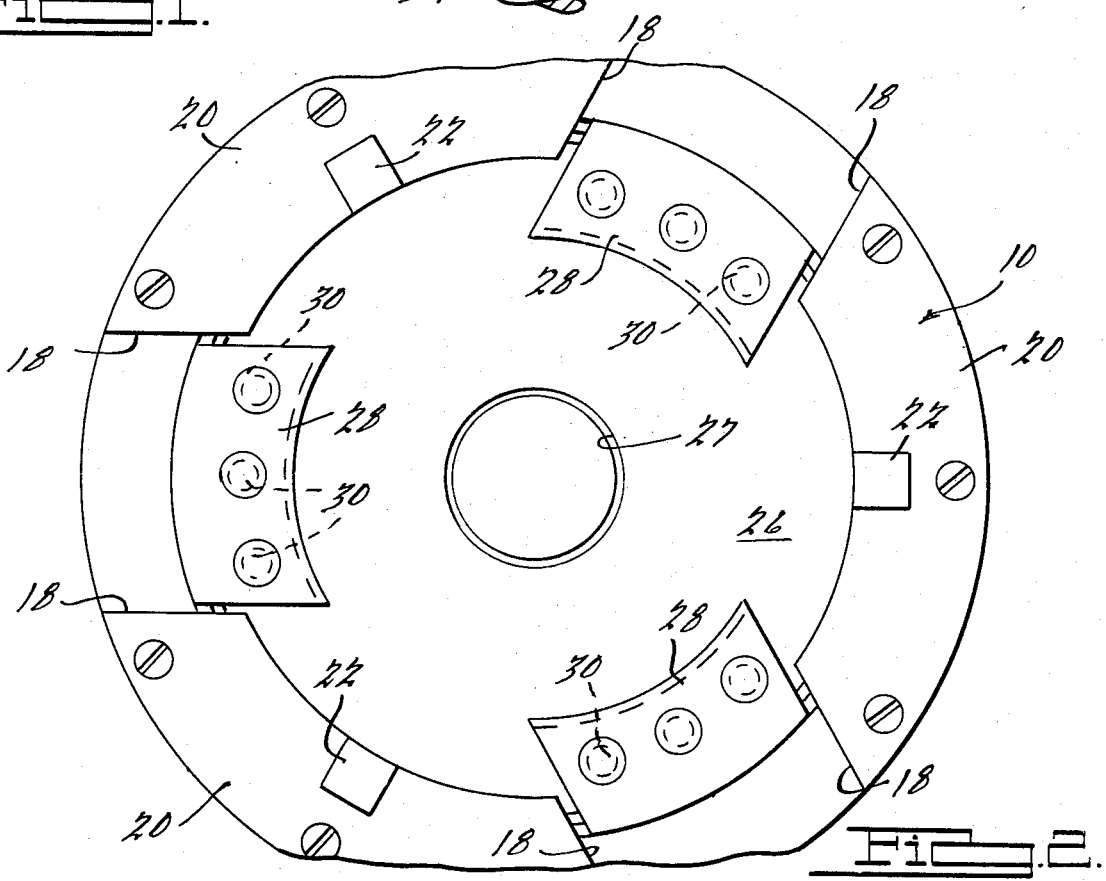
FIG. 2 is a plan view of the chuck and chuck collet of FIG. 1.

The preferred embodiment of the invention is disclosed in FIGS. 1 and 2. Referring to these figures, the chuck body is generally indicated at 10; the collet is generally indicated at 12; and the workpiece which is shown in broken lines is generally indicated at 14.

The chuck body is generally of conventional construction and has an open top, cylindrical sidewalls 9 and 11 and a bottom having a central opening 16 therethrough. The top edge of the chuck body has a plurality of annularly spaced slots or recesses 18 formed therethrough, there being three of such slots in the embodiment illustrated. Annular inserts or dogs 20 are received within such slots and are suitably secured to the top edge of the chuck body by screws, for example.

A workstop 22 is formed integral with the top of each of the inserts 20 for supporting the over-edge of the workpiece 14, as shown in FIG. 1.

The body 10 is also formed with a plurality of annularly spaced openings 24 through the sidewalls so that the interior is accessible for chip removal.

In this embodiment the chuck body 10 is shown as a single member and may be formed of conventional material used for that purpose.

The chuck collet 12 comprises an annular base 26 having its peripheral surface bearing against the surface 11 as shown in FIG. 1; a plurality of chuck jaws 28, and there being three in the embodiment illustrated; and interconnecting members between the chuck jaws 28 and the base 26 which in this embodiment are in the form of spring steel or spring tempered steel rods 30. The materials selected for the rods have such properties as to be stiff enough to hold the jaws away from the workpiece for ready insertion of the workpiece between the jaws, be flexible enough to accommodate the rough chip of the workpiece and still permit it proper clamping, and be strong enough to handle the high axial forces necessary to aim the jaws into clamping configurations. The rods 30 are of such length as to give the required movement between the clamp and unclamp positions consistent with the other required functions of the rods. As best seen in FIG. 2, at least three rods 30 are connected to each jaw 28, with all of the rods connected to a single jaw intersecting base 26 along an arcuate path.

The open inner edge of the body 10 adjacent the segments 28 and the outer surfaces of the segments 28 are provided with cooperative tapered surfaces 32 and 33 respectively as so that upon relative axial movements of the chuck body and chuck collet the segments 28 will be moved toward and away from workpiece to grip and release the workpiece.

As shown in FIG. 1, the periphery 27 of the annular base 26 of the collet 12 is in slidable engagement with the adjacent annular surface 11 of the chuck body 10, in the usual way.

The base 26 is provided with a central opening for receiving a coupling 34 which may be connected in the usual way to a draw screw for effecting the clamping and unclamping of the collet.

The collet segments 28 may be provided with serrations 36 or other means, such as carbide inserts, may be used if desired. As described above, the collet segments may be made of a material of selected hardness or the entire jaw segment may be made of carbide.

It will be understood that since the collet 12 is not constructed as a single unit but is constructed of separate elements 26, 28 and 30, the materials for these elements may be selected by the designer to give optimum functional results under the most economic conditions.

It will also be observed that the turning torque is taken by the inserts or dogs 20 on the chuck body which engage the jaws 28 so that the interconnecting rods 30 won't take the torque.

It is also pointed out that for roughing work three jaws as illustrated are preferable; but for finish work more jaws may be found to be desirable and such adaptations are obvious to one skilled in the art in light of the teachings of this disclosure.

Another modification of the invention is disclosed in connection with FIGS. 3 and 4. This modification is particularly adapted for the support of a workpiece of substantial length on the outside of the chuck collet and particularly for supporting a workpiece having substantial variations in its external contour along its length as well as having different internal diameters.

The clutch body which forms the support means for the collet is generally indicated at 10' and is formed of parts 38 and 44. The clutch collet is indicated at 12', and the workpiece is indicated at broken lines at 14'. It will be seen that the workpiece 14' has different internal diameters along its length so that the collet 12' is modified to grip the internal surfaces of the workpiece and accommodate the differences in internal diameters.

The chuck collet 12' comprises axially spaced upper jaw segments 28' and lower segments 29 viewing FIG. 3. The segments 28' and 29 are interconnected by rods 30' which are the same functionally as the interconnected rods 30 in the previously described embodiment. Observing FIG. 4 it will be seen that the jaws 28' and 29 are annularly staggered in an overlying relationship and connected by such rods 30' in such staggered relationship. It will also be seen by observing FIGS. 3 and 4 that the workpiece 14' is engaged by the outer cylindrical surfaces of the jaws 28' and 29 and that the O.D. of the jaw segments 29 are larger than 28' so as to grip the two different internal diameters of the workpiece 14'.

The clutch body member 10' comprises a base 38 having a central axial projection 40. The body 10' is provided with an annular tapered surface 42 which is adapted to cooperate with similarly tapered adjacent surfaces 43 on the inner face of the jaw segments 29. The elongated member 44 is disposed within the central opening 46 of the base 38 and has an integral upper annular portion 48 formed with a tapered surface 50 which is adapted to engage a similarly tapered surface 51 on the inner faces of the upper jaw segments 28'.

The member 44 is pulled into the body 10' by suitable means and the relative axial movement effects clamping of the jaws 28' and 29 by forcing them outwardly against the adjacent inner diameters of the workpiece 14' due to the interaction of the cam surfaces 42 and 50. The clamping jaws may be held in that position by a set screw 52.

Again, it is pointed out that in this embodiment the elements 28', 29 and 30' forming the collet are separate and have the advantage of material selectibility as described above.

Referring to FIG. 5, another modified structure is illustrated in which leaf spring elements 54 are employed for interconnecting the central base 26 and the collet jaws 28. This leaf spring is relatively narrow as shown in FIG. 6 and is designed to have substantially the same functional characteristics as the rods 30. The leaf spring 54 would, in effect, be substitutes for the rods 30 as shown in FIGS. 1 and 2.

Referring to FIG. 7, a further modification of interconnecting means is illustrated in which the collet base 26 and the jaws 28 are interconnected by a single flat spring leaf member 56 which may be designed by its length, thickness and transverse width to give it the same desired flexibility and strength characteristic as the plurality of rods as disclosed in the previous embodiment.

I claim:
1. A chuck for a stationary machine tool for engaging a workpiece for rotation comprising; (a) an elongated support means adapted to be mounted for rotation on a machine, (b) an elongated chuck collet supported by said support means for solely axial motion with respect thereto, said support means having axially spaced first and second surfaces, said collet having axially spaced first and second surfaces, said first collet surface and said first support means surface being correspondingly tapered and engaging one another, for deflecting said first surface of said collet radially to grip said workpiece upon relative axial motion between said collet and said support means in one direction and to release said workpiece upon relative axial motion between said collet and said support means in the opposite direction, said second collet surface and said second support means surface being generally cylindrical and engaging one another for guiding axial movement of said chuck collet relative to said support means, said first collet surface being defined by three or more annular jaw segments and said second collet surface being defined by an annular base, said jaw segments being connected to said base by at least three separate and elongated spring steel rods constructed so that they are stiff enough to support said jaw segments away from said workpiece and flexible enough to accommodate and grip workpieces having rough surfaces and/or having differing cross-sectional shapes, said flexible members being formed of a material chosen for its flexibility and said jaw segments being formed from a different material chosen for its hardness, said rods being disposed in holes in said base member with all of the rods connected to a single jaw segment intersecting said base member and said jaw segment along an arcuate path, and (c) means on said support means for transmitting rotary driving forces from said support means to said chuck collet without significantly tortionally stressing said flexible members.

* * * * *